Figure 1:
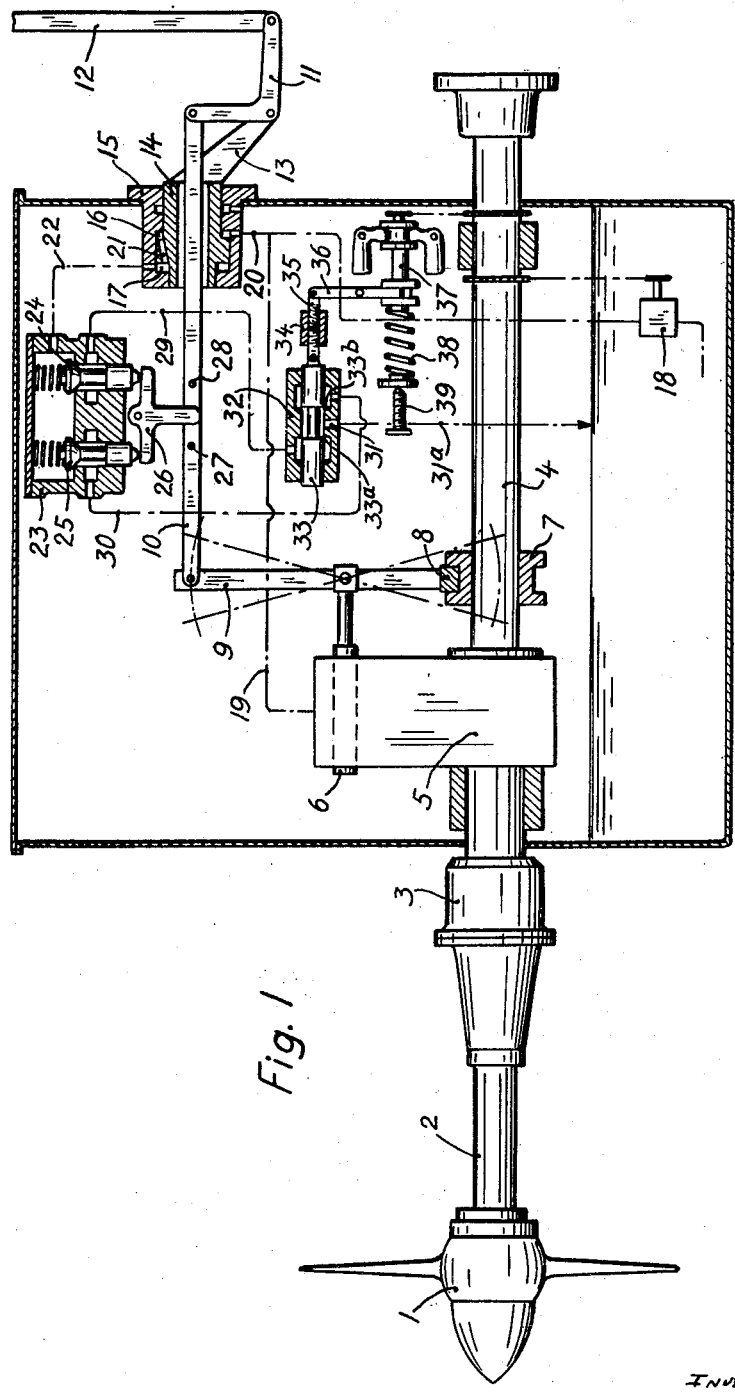

Jan. 15, 1957 N. J. LIAAEN 2,777,525
CONTROLLABLE PITCH PROPELLER
Filed March 12, 1952 2 Sheets-Sheet 1

INVENTOR
Nils J. Liaaen
By Watson, Cole, Grindle &
Watson
ATTYS

United States Patent Office 2,777,525
Patented Jan. 15, 1957

2,777,525

CONTROLLABLE PITCH PROPELLER

Nils Johannes Liaaen, Alesund, Norway

Application March 12, 1952, Serial No. 276,154

3 Claims. (Cl. 170—160.19)

The present invention relates to a control system for a controllable pitch propeller in which the adjustment of the pitch of the propeller blades is effected by means of a servomotor and which, besides a manually operated pitch control device, comprises an additional pitch control device, working in dependence on the load of the propulsion engine for the purpose of maintaining approximately constant load on the engine at varying resistance of the vessel, the automatically working device comprising switching means actuated by the manually operated device for bringing the automatically working device into or out of action.

According to the invention the manually operated device and the additional automatically working device of such control system are so made that the adjustment of the pitch of the propeller blades in the ranges of medium pitch for forward and astern is effected exclusively by means of the manually operated device, the automatically working device being automatically brought into action only in the phases of the path of movement of the manually operated control device corresponding to the ranges of the largest pitch for which the propeller blades can be adjusted for ahead and/or astern at a desired maximum load on the propulsion engine.

The automatically working device may comprise a servomotor controlled by the governor of the propulsion engine or by a separate governor regulating in synchronism with the same and controlling the slide of the usual servomotor for adjusting the pitch of the propeller blades. The governor or governors may be adjustable and may, if two governors are used simultaneously, be adjusted by remote control from the bridge or other suitable place in the ship.

The manually operated device may be mounted on or connected with a movable element of the automatically working device.

Figure 2:
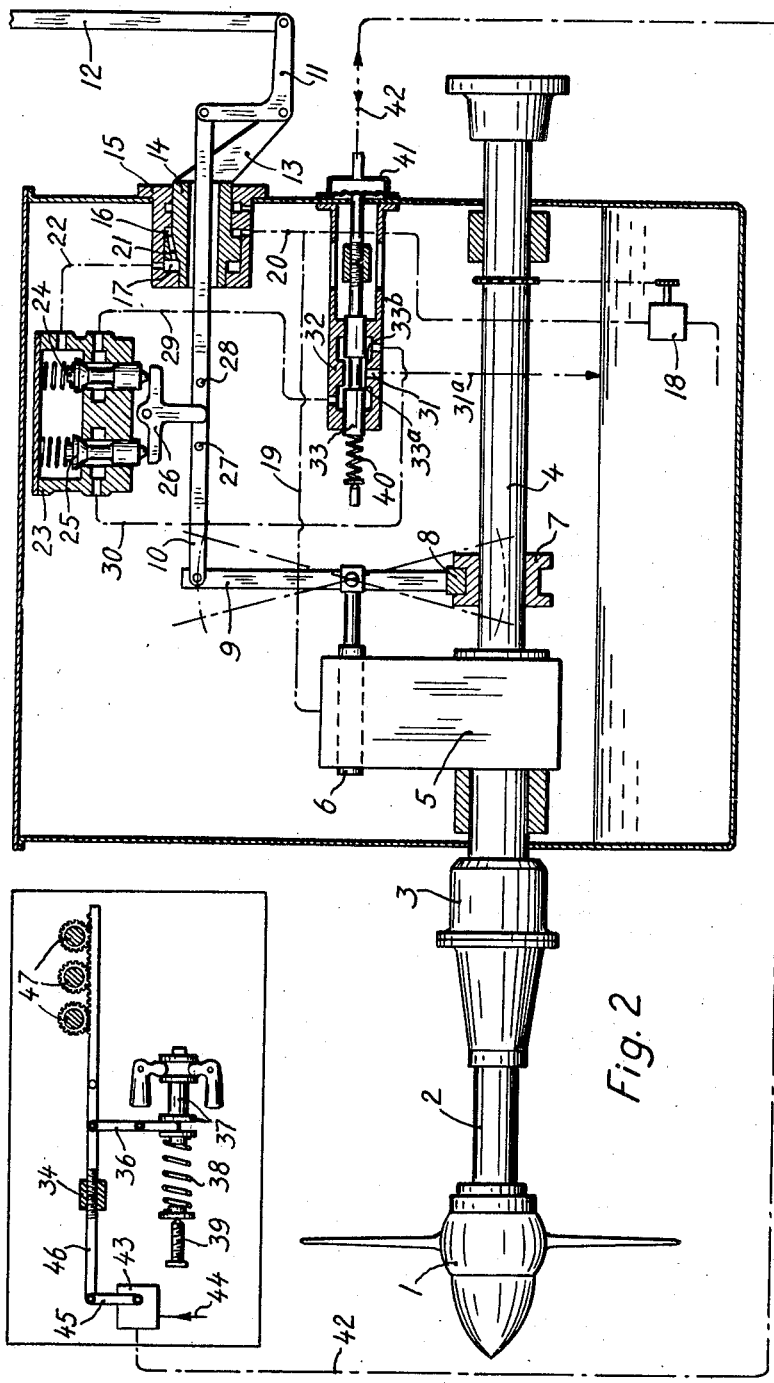

The construction and operation of the system according to the invention will be readily understood from the following description of two specific embodiments shown on the accompanying drawings, wherein like reference numerals designate like parts in both figures and wherein:

Figure 1 is a diagrammatic view of a system according to the invention in the case when the automatically operative means is actuated by a separate governor operatively dependent upon the propulsion engine load; and Figure 2 is a similar view illustrating the case when the automatically operative means is actuated by the ordinary governor of the propulsion engine.

Referring now to the drawings, the numeral 1 indicates the propeller, 2 the propeller shaft, 3 a hydraulic servomotor arranged in an enlarged portion of the shaft such as fully described and illustrated in U. S. Patent No. 2,679,233, to which reference is made, and 6 the oil distributing control slide of the servo-motor which as shown may be located on the oil inlet ring 5 to the servomotor.

The manually operated adjusting means for the slide 6 and thereby for the propeller blade pitch comprise a rod or handle 12 actuating a bell crank lever 11, the upper end of which by means of the rod 10 is connected with the two-armed lever 9, the lower end of which is mounted on a pivot in the ring 8, which in turn is mounted on the setting ring 7 which through a rod (not shown) is connected with the servo-motor piston in the servo-motor cylinder 3. The slide 6 is connected with the lever 9 approximately at the middle of the length of the same.

The automatically operative pitch adjustment means comprises a stepped piston 14 slidable in the cylinder 15 and carrying a bracket 13 on which the bell crank lever 11 is pivotally mounted.

The space 16 of the cylinder 15 is supplied with oil under pressure by an oil pump 18 through the tube 20 branching off from the tube 19 which delivers oil under pressure to the servo-motor slide 6. The oil pump 18 is driven by a chain drive from the intermediate shaft 4. A narrow passage 21 in the piston 14 allows oil to pass from the space 16 to the space 17 of the cylinder 15. From the space 17 of the piston a tube 22 leads to a valve casing 23, including two valves 24 and 25 operable by means of a two-armed pivotal lever 26, which may be actuated by means of either of two stops 27 and 28 on the rod 10, upon longitudinal movement of the latter.

The valves 24 and 25, respectively, control the connection, through tubes 29 and 30, respectively, between the valve casing 23 and a slide casing 32 having a port 31 which, through a tube 31a conveys the oil to the supply tank for the oil pump 18. Slidably mounted in the slide casing 32 is a valve member 33 which along its axial length has a portion of reduced cross section, thereby providing control edges 33a and 33b, respectively, adapted to cooperate with the edges of a corresponding portion of decreased light opening of the slide casing 32. The slide valve member 33 extends into a threaded portion engaging one end of a right and left hand theaded nut 34, the other end of which is engaged by a threaded rod 35, through which motion is imparted to the valve member 33 in dependence on a governor 37 operatively depended upon the propulsion engine load.

Up to this point the embodiments shown in Figures 1 and 2 are substantially alike.

As the constructional differences of the two embodiments do not affect the operation of the systems as a whole, the two embodiments are now to be described separately, whereupon the manner of operation, common to both, will be described.

Referring now to Figure 1, the free end of the threaded rod 35 is pivotally connected to a pivotally mounted lever 36, the other end of which is operatively connected to the governor 37 which is operatively connected to the intermediate shaft 4. The swing of the governor 37 is controlled by a spring 38 which is adjustable by a screw 39. As shown, the governor 37, in this case, is a separate governor serving solely the pitch control system, a second governor (not shown) being, in the usual manner, provided for the control of the fuel supply of the propulsion engine. Obviously, the two governors then have to operate in full conformity (synchronism), which may be effected in any suitable manner such as manually or remote controllable common governor control spring adjustment means, similar to the screw 39.

In the embodiment shown in Figure 2, one common governor 37 is used both for the operation of the automatic pitch control system and for the fuel control of the propulsion engine. For this purpose, the right end of the slide member 33 is operatively connected to a diaphragm 41a mounted in a diaphragm box 41 loaded by a spring 40 and actuated by fluid pressure supplied through a tube 42 under the control of the governor 37, shown at the left top of the figure, through pressure reduction valve 43 connected to the governor 37 through a lever 45 and a rod 46, a turnbuckle nut 34 being connected to the pivot lever 36 of the governor. The same lever 36 also serves to adjust the fuel feed control means 47 of the propulsion engine.

The manner of operation of the system will now be described.

When the engine is running and the manually operated lever 12 is in the position shown, both valves 24 and 25 are closed and consequently no oil delivered by the pump 18 is allowed to pass through the tubes 22, 29 and 30. The pump 18 is, however, setting up an oil pressure in the space 16 of the cylinder 15, a pressure which is admitted through the passage 21 to the space 17 of the same cylinder. Due to the greater surface of the piston 14 facing the space 17 than the surface of the piston facing the space 16, the piston 14 will be moved into and maintained in its extreme right position.

When the lever 12 is lowered or tilted for the purpose of adjusting the pitch setting for ahead or astern service, respectively, of the propeller, the bell crank lever 11 is pivoted relatively to the bracket 13 which is locked in position by the piston 14 being maintained in its right end position, and consequently the rod 10 is moved longitudinally. When the rod 10 is moved to the right, the lever 9 will swing about its lower pivot and move the slide 6 to the right, whereby oil under pressure is fed to the servo-motor 3, so that the servo-motor piston together with the setting ring 7 are moved to the left (causing an increase of the propeller pitch), whereby the slide 6 is brought back into its moddle position. Any position of the rod 10 corresponds to a certain pitch of the blades 1.

By continued movement to the right, the rod 10 is moved so far as to bring the stop 27 into engagement with the leg of the pivotal lever 26 which is then swung to a position wherein the right arm lifts the valve 24 from its seat in the casing 23, thus opening the connection between the space 17 of the cylinder 15, through the tube 22, the space of the casing 23, the tube 29 and the left end of the slide casing 32.

Up to this position of the rod 10 the load on the engine is moderate and the amplitude of the weights of the governor greater than shown in the drawing. Consequently, the lever 36 is swung in clockwise direction and the passage over edge 33a on slide member 33 is closed.

Upon a further lowering of the rod 12 and consequently a further movement of the rod 10 to the right, the pitch of the propeller and the load on the engine will increase, whereby the number of revolutions of the engine will be slightly decreased, the amplitude of the weights of the governor will decrease and the lever 36 will swing in an anti-clockwise direction, thereby effecting some opening of the passage over edge 33a. As a result, an oil flow is established in the system between the pipe 20, over valve 24 to pipe 31a, effecting a drop of the pressure in the space 17 of the cylinder 15. Upon the occurrence of a certain relation between the area of the passage over edge 33a and the area of the bore 21 in piston 14 (the low pressure space), the total pressure will be equal on both sides of the piston 14, and the piston consequently will be in a state of equilibrium. The automatic pitch control system is then in operative condition.

Assuming now that the resistance of the vessel increases, for instance by reason of a head wind, the speed of the vessel decreases, whereby the propeller torque is increased and the load of the engine is increased with a consequent slight reduction of the number of revolutions of the intermediate shaft 4. Consequently, the swing of the governor 37 is decreased with the result that the lever 36 performs an anti-clockwise motion, thereby moving the slide member 33 to the left. The flow passage past the edge 33a is increased and the pressure in the space 17 of the cylinder 15 is consequently decreased. As a result, the pressure in space 17 is overcome by the pressure in space 16 and the piston 14 is moved to the left in the cylinder 15, carrying along the bracket 13 with the result that the rod 10 is moved longitudinally to the left (without effecting any longitudinal movement of the rod 12), and the propeller pitch is reduced through the previously described system 9, 6, 5, 3. Thus, the propeller torque is decreased, the load on the propulsion engine consequently reduced and the number of revolutions of the same again increased to the initial value. Consequently, the amplitude of the governor 37 is increased and the slide member 33 returned to a position of equilibrium.

If the propeller torque is decreased, the number of revolutions of the engine is increased, the amplitude of the governor 37 increased and the valve member 33 moved to the right, thereby throttling the flow area past the edge 33a with the result that the pressure in the space 17 of the cylinder 15 is increased and the piston consequently moved to the right. By the movement to the right of the rod 10 the pitch setting is increased, thus increasing the propeller resistance, and the number of revolutions of the engine is reduced. Consequently, the slide member 33 is returned to the equilibrium position.

For astern service the rod 10 is moved to the left. The stop 28 engages the leg of the pivotal lever 26, causing the same to swing to the left, whereby the valve 25 is opened, thus opening an oil circulating system from the pump 18 through the tube 20, space 16, passage 21, space 17, tube 22, casing 23, valve 25, tube 30, right space of slide casing 32, passage past control edge 33b, port 31, tube 31b to the oil tank. The operation of the automatic system otherwise fully corresponds to the operation of the system in the ahead direction, bearing in mind that the astern pitch has to be decreased towards zero for unloading the engine. In order to obtain this the oil flow in tube 22 has to be directed through the passage over edge 33b.

In both embodiments shown and described the automatic pitch adjustment means obviously cooperates with the engine fuel supply system which is under the control of a separate, conformally operating governor, Figure 1, or under the control of the same governor controlling the pitch adjustment system, Figure 2. In the above description, this cooperation has been left out of consideration in order not to encumber the description. It will, however, be obvious to those skilled in the art that the activity of the fuel supply control system is such as to assist the automatic pitch adjustment system in reducing any variations in the propulsion engine load due to variations in propeller resistance.

As described above, the automatically operative pitch adjustment is brought into operative condition by the engagement between the stops 27 or 28, respectively, and the leg of the lever 26. Consequently, the position of the said stops in the path of movement of the rod 10 between zero and maximum pitch setting for ahead and astern, respectively, determines the higher limits of the lower pitch settings at which the automatic system is to stand by for action under the control of the governor 37. It has been found that the distance between the said stops 27 and 28 should preferably correspond to a pitch setting range, for ahead and astern, above that corresponding to about ¾ of the highest engine load. In this manner the automatic system would not be operative during maneuvering for instance into or out of harbor, but merely at higher speeds of the vessel.

The lever 36 gives, for a certain position, a certain delivery of the fuel pumps 47 (Figure 2) and therewith a certain output of the engine at a certain number of revolutions. Simultaneously the position of lever 36 gives a certain position of the lever 45 and therewith a certain pitch and torque of the propeller 1. By adjusting the nut 34 the position of lever 45 and the propeller 1 can be adjusted as against the delivery of the fuel pumps 47 and therewith the output of the engine. The action of the nut 34 is equivalent in both embodiments shown.

It should be understood that the foregoing description relates only to preferred embodiments of the invention

I claim:

1. A controllable pitch propeller control system comprising, in combination, a servomotor for the adjustment of the propeller blade pitch, servomotor control means, manually operative means for actuating said control means, a governor operatively dependent upon the propulsion engine load, means operatively connecting the said governor and said servomotor control means for automatically varying the position of the servomotor control means from the position to which it has been set by said manually operative means, a valving device controlling the operative condition of said last-mentioned means, and operating means for said valving device actuable by the manually operative means and comprising members provided in such position on the said manually operative means as to actuate said valving device by continued ordinary movement of the said manually operative means beyond the range of lower pitch settings at a predetermined highest propulsion engine load for ahead and astern, respectively.

2. A controllable pitch propeller control system as defined in claim 1, wherein the said means which operatively connect the said governor and the said servomotor control means comprise a cylinder and piston system, the piston being mechanically connected to the said manually operative means.

3. A controllable pitch propeller control system as defined in claim 2, said piston being stepped.

References Cited in the file of this patent

UNITED STATES PATENTS

| | | |
|---|---|---|
| Re. 22,661 | Gosslau et al. | Aug. 7, 1945 |
| 2,145,859 | Caldwell | Feb. 7, 1939 |
| 2,306,953 | Jung | Dec. 29, 1942 |
| 2,343,378 | Kieser | Mar. 7, 1944 |
| 2,423,191 | Kopp | July 1, 1947 |
| 2,478,796 | Willi | Aug. 9, 1949 |
| 2,504,209 | Martin et al. | Apr. 18, 1950 |
| 2,588,371 | Englesson | Mar. 11, 1952 |

FOREIGN PATENTS

| | | |
|---|---|---|
| 66,863 | Netherlands | Dec. 15, 1950 |
| 250,476 | Switzerland | June 16, 1948 |
| 578,679 | Great Britain | July 8, 1946 |
| 598,905 | Great Britain | Mar. 1, 1948 |
| 903,082 | France | Sept. 24, 1945 |
| 913,010 | France | Aug. 27, 1946 |
| 985,626 | France | July 20, 1951 |